US012222488B2

(12) United States Patent
Peng et al.

(10) Patent No.: US 12,222,488 B2
(45) Date of Patent: Feb. 11, 2025

(54) OBSERVATION CARRIER FOR MICROSCOPE (71) Applicant: FlowVIEW Tek, Taipei (TW)

(72) Inventors: Po-Yang Peng, Taipei (TW);
Chun-Chieh Liang, Taipei (TW);
Liang-Hsun Lai, Taipei (TW);
Cheng-Yu Lee, Taipei (TW);
Hsin-Hung Lee, Taipei (TW)

(73) Assignee: FlowVIEW Tek, Taipei (TW)

( * ) Notice: Subject to any disclaimer, the term of this patent is extended or adjusted under 35 U.S.C. 154(b) by 591 days.

(21) Appl. No.: 17/500,958

(22) Filed: Oct. 14, 2021

(65) Prior Publication Data

US 2022/0146806 A1 May 12, 2022

Related U.S. Application Data (60) Provisional application No. 63/113,173, filed on Nov. 12, 2020.

(30) Foreign Application Priority Data

Jun. 23, 2021 (TW) ................................. 110122954

(51) Int. Cl.
*G02B 21/26* (2006.01)
(52) U.S. Cl.
CPC .................... *G02B 21/26* (2013.01)
(58) Field of Classification Search
CPC .... G02B 21/26; G02B 21/00; G02B 21/0004; G02B 21/24; C12M 21/00; C12M 23/00; C12M 23/02; C12M 23/16; C12M 23/38; C12M 23/34; C12M 23/32; C12M 35/00; C12M 35/02

USPC ........ 359/368, 362, 363, 369, 391; 356/244, 356/246; 435/305.1, 305.4; 436/164, 436/172; 73/864.91
See application file for complete search history.

(56) References Cited

U.S. PATENT DOCUMENTS

2020/0240933 A1  7/2020  Yuk et al.

FOREIGN PATENT DOCUMENTS

| CN | 110186942 | 8/2019 | |
| CN | 110186944 | 8/2019 | |
| CN | 209591971 | 11/2019 | |
| DE | 10252773 A1 * | 7/2003 | ......... C07K 14/4756 |
| JP | 2016219102 | 12/2016 | |
| JP | 3222404 | 8/2019 | |

(Continued)

OTHER PUBLICATIONS

"Integrate", Merriam-Webster's Collegiate Dictionary, 2001, pp. 606. (Year: 2001).*

(Continued)

*Primary Examiner* — Arnel C Lavarias
(74) *Attorney, Agent, or Firm* — JCIP GLOBAL INC.

(57) ABSTRACT

An observation carrier for a microscope is provided. The observation carrier includes a bottom base, an upper cover, and a chip. The upper cover is detachably disposed on the bottom base and has a window. The chip is integrated on the upper cover and includes a main body and a plurality of electrodes. The main body has an observation region, and the observation region corresponds to the window and is adapted to carry a sample material. The electrodes are disposed on the main body and are connected to the observation region.

10 Claims, 7 Drawing Sheets (56) References Cited

FOREIGN PATENT DOCUMENTS

KR       20210045782       4/2021
WO     WO-2005063961 A2 *   7/2005   ............ C12M 35/02

OTHER PUBLICATIONS

"Office Action of Japan Counterpart Application", issued on Sep. 30, 2022, p. 1-p. 3.
"Office Action of China Counterpart Application", issued on Mar. 27, 2024, p. 1-p. 9.

* cited by examiner

OBSERVATION CARRIER FOR MICROSCOPE

CROSS-REFERENCE TO RELATED APPLICATION

This application claims the priority benefit of U.S. Provisional Application No. 63/113,173, filed on Nov. 12, 2020 and Taiwan Application No. 110122954, filed on Jun. 23, 2021. The entirety of each of the above-mentioned patent applications is hereby incorporated by reference herein and made a part of this specification.

BACKGROUND

Technical Field

The invention relates to an observation carrier, and particularly relates to an observation carrier for a microscope.

Description of Related Art

Optical microscopes and electron microscopes may be used to observe nanoscale samples, and the samples need to be carried on an observation carrier to facilitate observation. Regarding a sample material that needs to be powered on for observation, it is generally deposited and coated on a chip, and the chip may be installed on the observation carrier and used as a medium for powering the sample material. Before each observation is performed, a user needs to install the chip on the observation carrier, and remove the chip from the observation carrier after the observation is completed, and such operation flow is complicated and causes inconvenience in use.

SUMMARY

The invention is directed to an observation carrier for a microscope, which is relatively simple in use.

The invention provides an observation carrier for a microscope including a bottom base, an upper cover, and a chip. The upper cover is detachably disposed on the bottom base and has a window. The chip is integrated on the upper cover and includes a main body and a plurality of electrodes. The main body has an observation region, and the observation region corresponds to the window and is adapted to carry a sample material. The electrodes are disposed on the main body and connected to the observation region.

In an embodiment of the invention, the chip is adhered to the upper cover.

In an embodiment of the invention, the observation carrier includes a liquid containing assembly, the liquid containing assembly is disposed on the bottom base and is adjacent to the chip, and the liquid containing assembly is adapted to contain a conductive liquid.

In an embodiment of the invention, the chip and the liquid containing assembly are joined to form a flow channel, the flow channel is adapted to contain the conductive liquid, the sample material includes an anode material and a cathode material, and a part of the flow channel is located between the anode material and the cathode material.

In an embodiment of the invention, the observation carrier includes a sealing ring, and the sealing ring is disposed between the bottom base and the upper cover and surrounds the chip.

In an embodiment of the invention, the observation carrier includes a power-on assembly, the power-on assembly is disposed on the bottom base and has a plurality of pins, and the pins respectively contact the electrodes of the chip.

In an embodiment of the invention, the observation carrier includes a sealing ring, the bottom base includes a bottom plate and a cover body, the cover body and the bottom plate are assembled to jointly contain the power-on assembly, and the sealing ring is disposed between the bottom plate and the cover body and surrounds the power-on assembly.

In an embodiment of the invention, the observation carrier includes a screw cap, wherein the screw cap is detachably disposed on the bottom base and limits a position of the upper cover to the bottom base.

In an embodiment of the invention, the bottom base has at least one positioning groove, the screw cap has at least one positioning post, and the at least one positioning post is adapted to be positioned in the at least one positioning groove along with rotation of the screw cap relative to the bottom base.

In an embodiment of the invention, the screw cap is adapted to be rotated relative to the bottom base along a rotation axis, the upper cover has a positioning flange, the bottom base has a positioning recess, and the positioning flange is positioned in the positioning recess to prevent the upper cover from rotating relative to the bottom base along the rotation axis.

Based on the above description, in the observation carrier for a microscope of the invention, the chip is directly integrated with the upper cover. In this way, the user may omit the step of mounting the chip to the upper cover before each observation, and omit the step of removing the chip from the upper cover after the observation is completed, so that the observation carrier for a microscope may be relatively simple in use.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
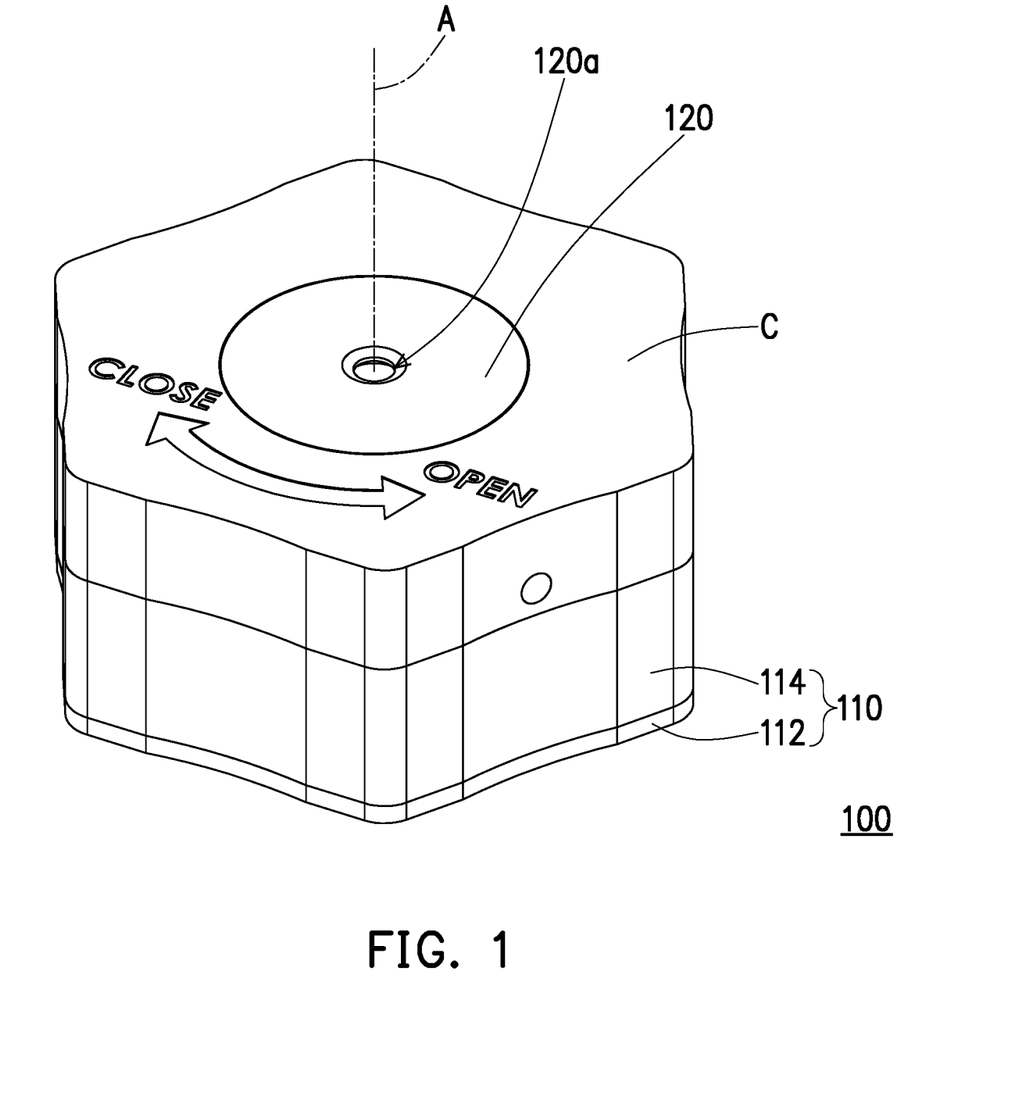
FIG. 1 is a three-dimensional view of an observation carrier for a microscope according to an embodiment of the invention.
Figure 2:
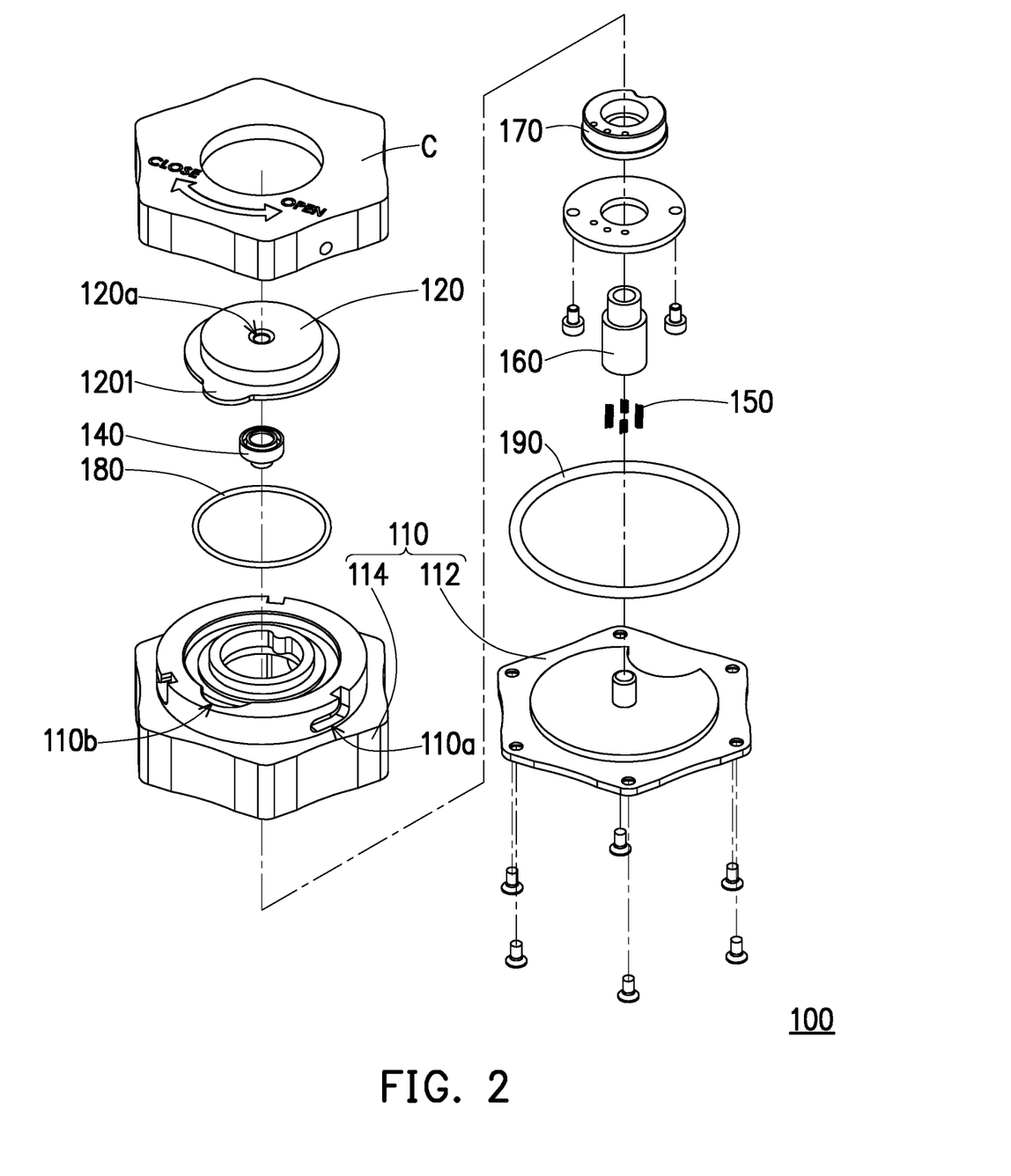
FIG. 2 is an exploded view of the observation carrier for a microscope of FIG. 1.
Figure 3:
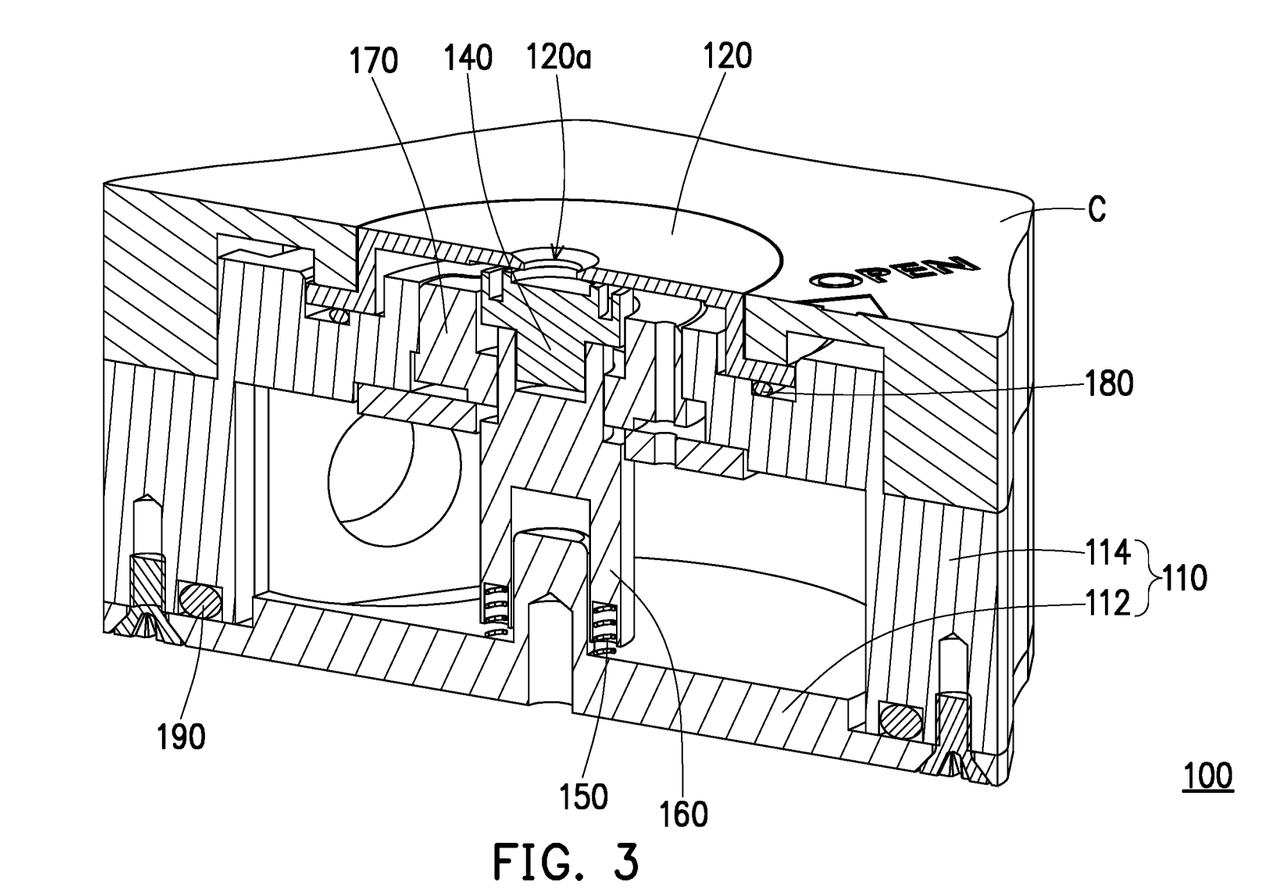
FIG. 3 is a three-dimensional view of a partial structure of the observation carrier for a microscope of FIG. 1.
Figure 4:
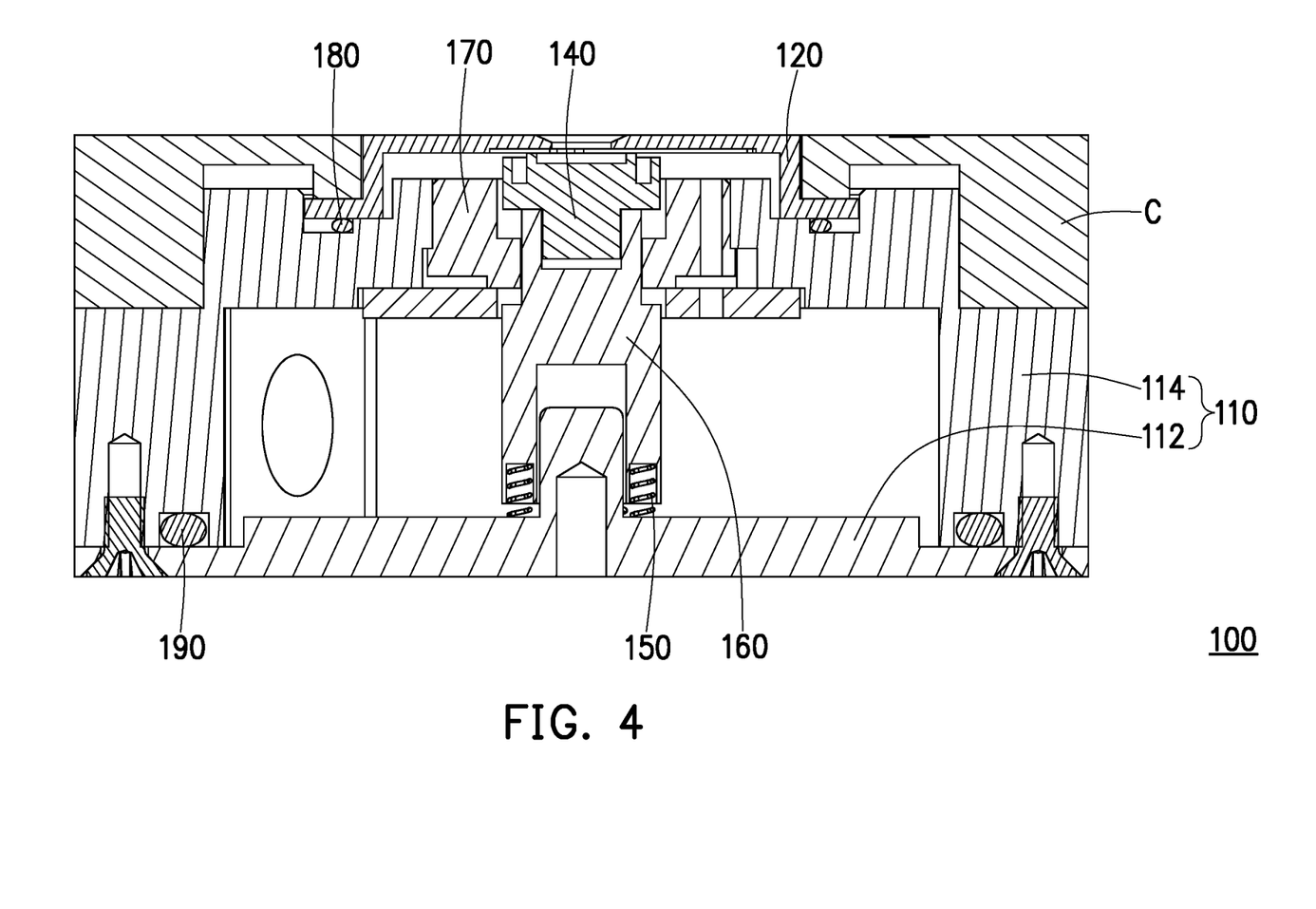
FIG. 4 is a side view of the observation carrier for a microscope of FIG. 3.

FIG. 1 is a three-dimensional view of an observation carrier for a microscope according to an embodiment of the invention. FIG. 2 is an exploded view of the observation carrier for a microscope of FIG. 1. FIG. 3 is a three-dimensional view of a partial structure of the observation carrier for a microscope of FIG. 1. FIG. 4 is a side view of the observation carrier for a microscope of FIG. 3. Referring to FIG. 1 to FIG. 4, an observation carrier for a microscope 100 of the embodiment includes a bottom base 110 and an upper cover 120. The upper cover 120 is detachably disposed on the bottom base 110 and has a window 120a. A user may observe a sample in the observation carrier for a microscope 100 through the window 120a.

Figure 5:
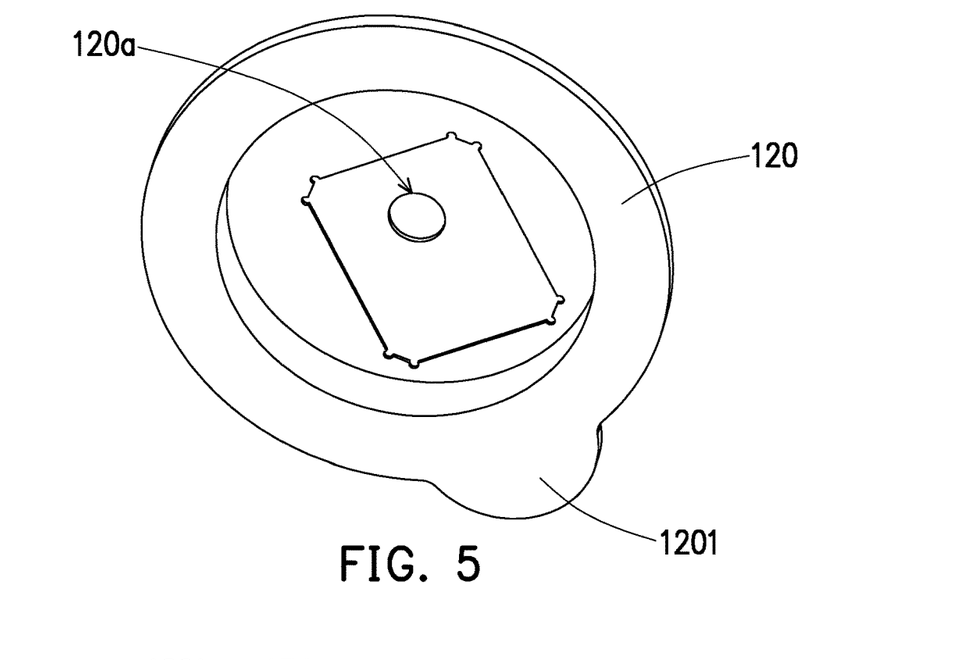
FIG. 5 is a three-dimensional view of an upper cover of FIG. 1.
Figure 6:
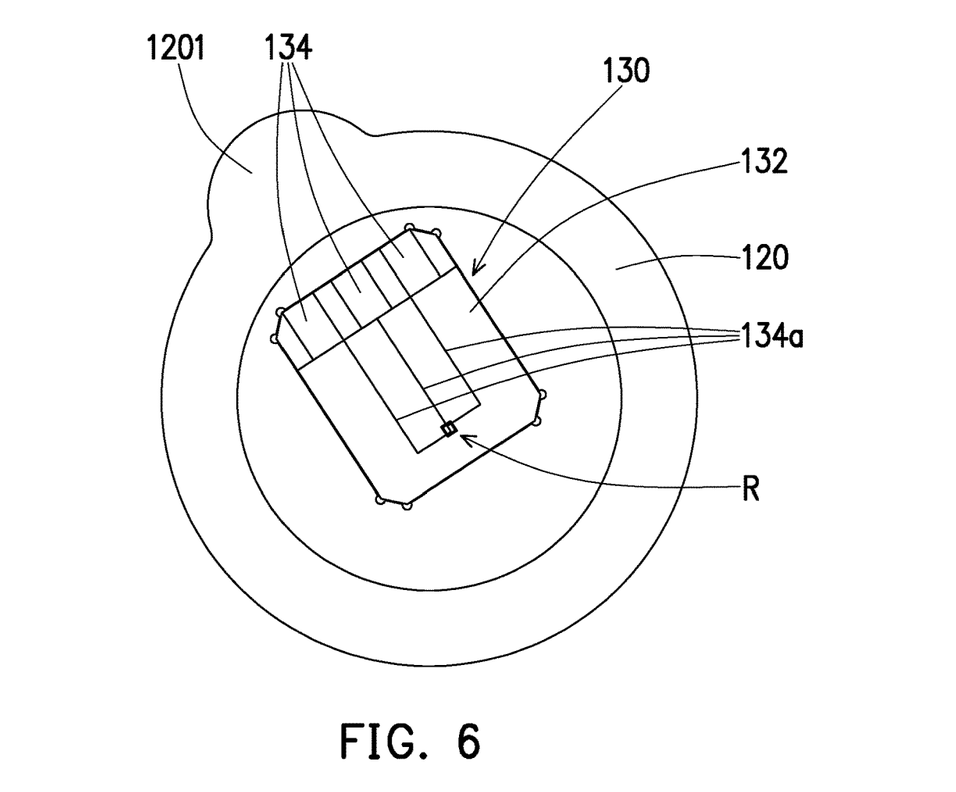
FIG. 6 illustrates a chip integrated with the upper cover of FIG. 5.

FIG. 5 is a three-dimensional view of the upper cover of FIG. 1. FIG. 6 illustrates a chip integrated with the upper cover of FIG. 5. In order to make the rest of the drawings clearer, only a chip 130 is illustrated in FIG. 6. Referring to FIG. 5 and FIG. 6, the observation carrier for a microscope 100 of the embodiment further includes the chip 130, and the chip 130 is integrated with the upper cover 120 by means of adhering or other suitable methods and includes a main body 132 and a plurality of electrodes 134 (three electrodes are shown). The main body 132 has an observation region R, and the observation region R corresponds to the window 120a of the upper cover 120 and is suitable for carrying a sample material, where the sample material is, for example, placed in the observation region R in a manner of deposition and coating. The electrodes 134 are disposed on the main body 132 and connected to the observation region R through wires 134a. The electrodes 134 may be used to power on the sample material in the observation region R, so as to facilitate observation.

As described above, in the observation carrier for a microscope 100 of the embodiment, the chip 130 is directly integrated with the upper cover 120. Accordingly, the user may omit the step of mounting the chip to the upper cover before each observation is performed, and omit the step of removing the chip from the upper cover after the observation is completed, so that the observation carrier for a microscope 100 may be relatively simple in use.

Figure 7:
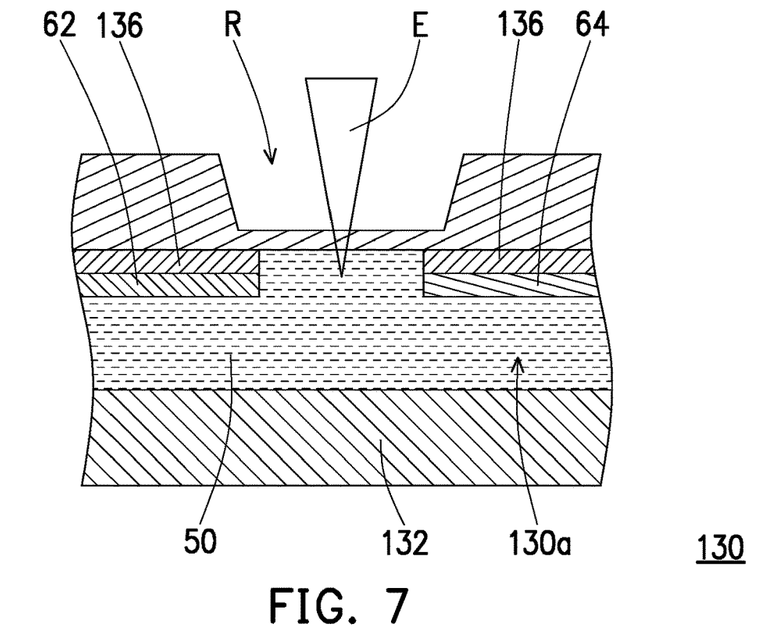
FIG. 7 is a schematic partial cross-sectional view of the chip of FIG. 6 after being joined to a liquid containing assembly.

FIG. 7 is a schematic partial cross-sectional view of the chip of FIG. 6 after being joined to a liquid containing assembly. Referring to FIG. 2, FIG. 4, and FIG. 7, in detail, the observation carrier for a microscope 100 of the embodiment further includes a liquid containing assembly 140, where the liquid containing assembly 140 is disposed on the bottom base 110 and adjacent to the chip 130 (shown in FIG. 6), and the liquid containing assembly 140 is suitable for containing a conductive liquid (electrolyte). After the chip 130 and the liquid containing assembly 140 are joined, a flow channel 130a may be formed in a space therebetween. The conductive liquid in the liquid containing assembly 140 may flow to the flow channel 130a, and the flow channel 130a is suitable for containing the conductive liquid 50. The sample material includes an anode material 62 and a cathode material 64, and a part of the flow channel 130a is located between the anode material 62 and the cathode material 64. The anode material 62 and the cathode material 64 receive an electric current from the electrodes 134 (shown in FIG. 6) through a conductive layer 136, and the sample material has a reaction (such as an oxidation-reduction reaction) in the flow channel 130a between the anode material 62 and the cathode material 64 under a function of the electric current. Therefore, an electron beam E provided by an electron microscope or a light beam provided by an optical measuring instrument (for example: an optical microscope) may be used for observation to study mechanism changes in electrochemical plating/stripping, oxidation-reduction reaction or semi-reaction, electrolyte and metal replacement reaction, dendrite growth of the material, etc., of the sample material. In addition, it is also possible to separately study changes or a real-time change of a substance in the conductive liquid (electrolyte) before and after receiving the electric current for reaction.

Referring to FIG. 2 and FIG. 4, the bottom base 110 of the embodiment may be configured with an elastic member 150 and a jacking member 160. The jacking member 160 is located between the elastic member 150 and the liquid containing assembly 140 and may jack up the liquid containing assembly 140 through an elastic force of the elastic member 150, such that the liquid containing assembly 140 may tightly lean against the chip 130.

The invention does not limit an observation mode of the sample, which may be observed by only using the conductive liquid contained in the liquid containing assembly 140 for assistance, or using the conductive liquid transferred and supplemented by external power.

Figure 8:
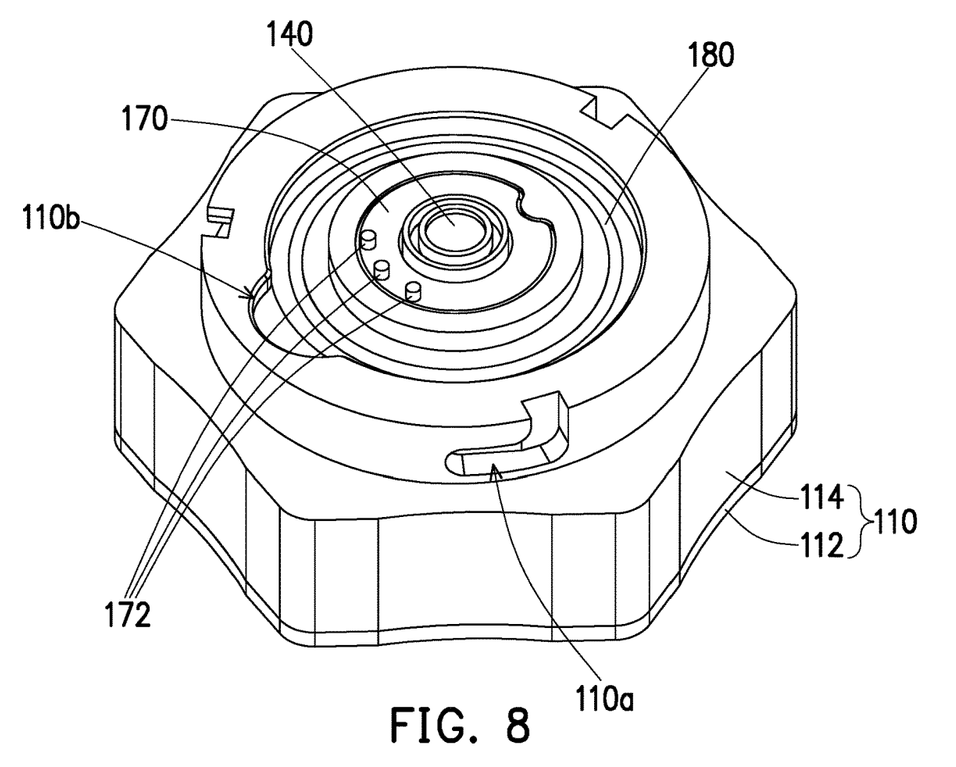
FIG. 8 is a three-dimensional view of a part of components of the observation carrier for a microscope of FIG. 1.

FIG. 8 is a three-dimensional view of a part of components of the observation carrier for a microscope of FIG. 1. The observation carrier for a microscope 100 of the embodiment further includes a power-on assembly 170 as shown in FIG. 2 to FIG. 4 and FIG. 8, the power-on assembly 170 is disposed on the bottom base 110 and has a plurality of pins 172 (shown in FIG. 8). The pins 172 are used to respectively contact the electrodes 134 (shown in FIG. 6) of the chip 130, so that the electric current from an external power supply may reach the chip 130 through the pins 172.

In the embodiment, the observation carrier for a microscope 100 further includes a sealing ring 180, where the sealing ring 180 is disposed between the bottom base 110 and the upper cover 120 and surrounds the chip 130 (shown in FIG. 6). The sealing ring 180 is, for example, a rubber ring or other elastic sealing material to isolate the chip 130 from the outside to facilitate observation. In addition, the bottom base 110 of the embodiment includes a bottom plate 112 and a cover body 114, and the cover body 114 and the bottom plate 112 are assembled to jointly accommodate the power-on assembly 170. The observation carrier for a microscope 100 further includes a sealing ring 190, which is disposed between the bottom plate 112 and the cover body 114 and surrounds the power-on assembly 170. The sealing ring 190 is, for example, a rubber ring or other elastic sealing material to isolate the power-on assembly 170 from the outside to facilitate observation. The sealing ring 180 also has a function of buffering a pressing force.

Figure 9:
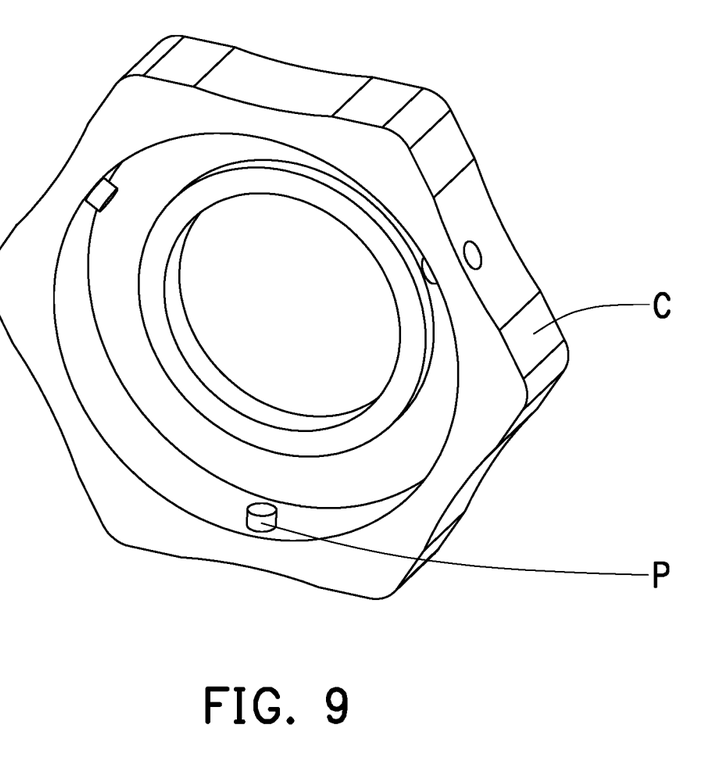
FIG. 9 is a three-dimensional view of a screw cap of FIG. 1.

The observation carrier for a microscope 100 of the embodiment further includes a screw cap C, which is detachably disposed on the bottom base 110 and limits a position of the upper cover 120 to the bottom base 110. When the screw cap C is rotated along a rotation axis A and is pressed down for being locked to the bottom base 110, an average pressing force may be generated at the same time, so that the sealing ring 180 in contact with the bottom base 110 and the upper cover 120 produces a sealing effect, which may isolate the outside from a sample to be tested in the observation region R. FIG. 9 is a three-dimensional view of the screw cap of FIG. 1. To be specific, the bottom base 110 has at least one positioning groove 110a (multiple positioning grooves are shown in FIG. 2 and FIG. 8), and the screw cap C has at least one positioning post P (multiple positioning posts are shown) as shown in FIG. 9, where the positioning posts P are adapted to be respectively positioned in the positioning grooves 110a along with rotation of the screw cap C relative to the bottom base 110 along the rotation axis A (indicated in FIG. 1). In conclusion, the upper cover 120 of the embodiment has a positioning flange 1201 as shown in FIG. 2 and FIG. 5, and the bottom base 110 has a positioning recess 110b as shown in FIG. 2 and FIG. 8, and the positioning flange 1201 is positioned in the positioning recess 110b to prevent the upper cover 120 from being unexpectedly driven by the screw cap C to rotate relative to the bottom base 110 along the rotation axis A.

In summary, in the observation carrier for a microscope of the invention, the chip is directly integrated with the upper cover. In this way, the user may omit the step of mounting the chip to the upper cover before each observation, and omit the step of removing the chip from the upper cover after the observation is completed, so that the observation carrier for a microscope may be relatively simple in use.

What is claimed is:

1. An observation carrier for a microscope, comprising:
   a bottom base;
   an upper cover, detachably disposed on the bottom base and having a window; and
   a chip, integrated to the upper cover and comprising a main body and a plurality of electrodes, wherein the main body has an observation region, and the observation region corresponds to the window and is adapted to carry a sample material, and the electrodes are disposed on the main body and are connected to the observation region,
   wherein the chip and the upper cover are configured to be installed to or removed from the bottom base simultaneously.

2. The observation carrier for a microscope as claimed in claim 1, wherein the chip is adhered to the upper cover.

3. The observation carrier for a microscope as claimed in claim 1, further comprising a liquid containing assembly, wherein the liquid containing assembly is disposed on the bottom base and is adjacent to the chip, and the liquid containing assembly is adapted to contain a conductive liquid.

4. The observation carrier for a microscope as claimed in claim 3, wherein the chip and the liquid containing assembly are joined to form a flow channel, the flow channel is adapted to contain the conductive liquid, the sample material comprises an anode material and a cathode material, and a part of the flow channel is located between the anode material and the cathode material.

5. The observation carrier for a microscope as claimed in claim 1, further comprising a sealing ring, wherein the sealing ring is disposed between the bottom base and the upper cover and surrounds the chip.

6. The observation carrier for a microscope as claimed in claim 1, further comprising a power-on assembly, wherein the power-on assembly is disposed on the bottom base and has a plurality of pins, and the pins respectively contact the electrodes of the chip.

7. The observation carrier for a microscope as claimed in claim 6, further comprising a sealing ring, wherein the bottom base comprises a bottom plate and a cover body, the cover body and the bottom plate are assembled to jointly contain the power-on assembly, and the sealing ring is disposed between the bottom plate and the cover body and surrounds the power-on assembly.

8. The observation carrier for a microscope as claimed in claim 1, further comprising a screw cap, wherein the screw cap is detachably disposed on the bottom base and limits a position of the upper cover to the bottom base.

9. The observation carrier for a microscope as claimed in claim 8, wherein the bottom base has at least one positioning groove, the screw cap has at least one positioning post, and the at least one positioning post is adapted to be positioned in the at least one positioning groove along with rotation of the screw cap relative to the bottom base.

10. The observation carrier for a microscope as claimed in claim 8, wherein the screw cap is adapted to be rotated relative to the bottom base along a rotation axis, the upper cover has a positioning flange, the bottom base has a positioning recess, and the positioning flange is positioned in the positioning recess to prevent the upper cover from rotating relative to the bottom base along the rotation axis.

* * * * *